United States Patent
Zofcin et al.

(10) Patent No.: US 11,780,377 B2
(45) Date of Patent: Oct. 10, 2023

(54) MOUNTING BRACKETS PACKAGED WITHIN ROOF DITCH CHANNELS OF VEHICLES

(71) Applicant: Toyota Motor Engineering & Manufacturing North America, Inc., Plano, TX (US)

(72) Inventors: David A Zofcin, Belleville, MI (US); Kaitlyn A. Cherniuk, Ypsilanti, MI (US); Arthur Henry Whitney, Fenton, MI (US); Luke W. Garnaut, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/582,511

(22) Filed: Jan. 24, 2022

(65) Prior Publication Data
US 2023/0234516 A1    Jul. 27, 2023

(51) Int. Cl.
*B60R 9/042*    (2006.01)
*B60R 9/058*    (2006.01)

(52) U.S. Cl.
CPC .............. *B60R 9/042* (2013.01); *B60R 9/058* (2013.01)

(58) Field of Classification Search
CPC ....................................................... B60R 9/058
See application file for complete search history.

(56) References Cited

U.S. PATENT DOCUMENTS

| | | | | |
|---|---|---|---|---|
| 4,343,419 A | * | 8/1982 | Mareydt | B60R 9/04 224/326 |
| 5,013,083 A | * | 5/1991 | Yada | F16B 5/128 296/213 |
| 5,829,825 A | * | 11/1998 | Kim | B60R 13/04 296/213 |
| 6,311,882 B1 | * | 11/2001 | Allison | B60R 9/04 224/330 |
| 6,510,662 B2 | * | 1/2003 | Ichimaru | F16B 5/121 52/716.5 |
| 6,557,931 B1 | * | 5/2003 | Tremmel | B60R 9/04 296/213 |
| 6,695,397 B2 | * | 2/2004 | Kamiya | B60R 13/04 296/210 |
| 6,902,229 B2 | * | 6/2005 | Bradbrook | B60R 9/04 296/210 |
| 7,004,535 B1 | | 2/2006 | Osterberg et al. | |

(Continued)

FOREIGN PATENT DOCUMENTS

DE    102012014697 B4    2/2014
IN    201711029126 A    6/2019

*Primary Examiner* — Brian D Nash
(74) *Attorney, Agent, or Firm* — Dinsmore & Shohl LLP

(57) ABSTRACT

A vehicle includes a roof assembly including a roof having an outer facing surface and a roof ditch that extends below the outer facing surface. The roof ditch extends in a vehicle longitudinal direction between a front windshield and a rear window. A roof ditch sealer is located at least partially within the roof ditch. A mounting bracket for mounting a vehicle accessory is located in the roof ditch. The mounting bracket may include sealer dam portions that extend downward at opposite sides of a mounting surface of the mounting bracket to provide end stops for the roof ditch sealer.

10 Claims, 5 Drawing Sheets

(56) References Cited

U.S. PATENT DOCUMENTS

| | | | | |
|---|---|---|---|---|
| 7,017,788 | B2* | 3/2006 | Trambley | B60R 9/04 |
| | | | | 248/300 |
| 7,296,849 | B2* | 11/2007 | Tremmel | B60R 13/04 |
| | | | | 296/210 |
| 7,429,069 | B2* | 9/2008 | Kellinghaus | E04F 19/061 |
| | | | | 296/210 |
| 7,604,287 | B2* | 10/2009 | Mourou | B60R 13/04 |
| | | | | 296/213 |
| 7,641,250 | B2* | 1/2010 | Gambatese | B60R 13/04 |
| | | | | 296/213 |
| 7,695,038 | B2* | 4/2010 | Harberts | B60R 13/04 |
| | | | | 296/210 |
| 8,020,354 | B2* | 9/2011 | Scroggie | B60R 13/04 |
| | | | | 52/716.2 |
| 8,205,923 | B2* | 6/2012 | Mourou | B60R 13/0206 |
| | | | | 52/716.5 |
| 8,523,032 | B2 | 9/2013 | Neidlein | |
| 8,657,370 | B1* | 2/2014 | Pierce | B60R 13/06 |
| | | | | 296/213 |
| 8,677,572 | B2* | 3/2014 | Scroggie | F16B 5/123 |
| | | | | 296/210 |
| 8,789,732 | B2 | 7/2014 | Aftanas et al. | |
| 8,955,896 | B2* | 2/2015 | Baxter | B60J 10/30 |
| | | | | 296/213 |
| 9,174,591 | B2* | 11/2015 | Bach | B60R 13/04 |
| 10,179,435 | B2* | 1/2019 | Porter | B29C 48/904 |
| 2002/0101096 | A1* | 8/2002 | Nagasawa | B60R 13/04 |
| | | | | 296/210 |
| 2002/0180246 | A1* | 12/2002 | Nagashima | B60R 13/04 |
| | | | | 296/210 |
| 2006/0049322 | A1* | 3/2006 | Hirano | B60R 11/00 |
| | | | | 248/237 |

* cited by examiner

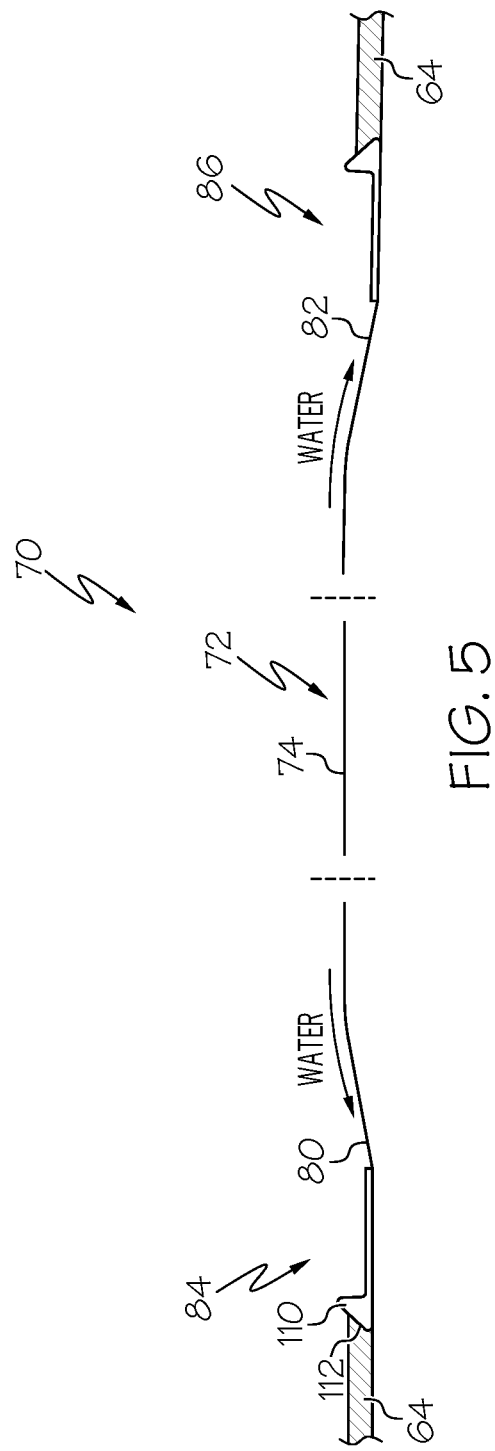

MOUNTING BRACKETS PACKAGED WITHIN ROOF DITCH CHANNELS OF VEHICLES

TECHNICAL FIELD

The present specification generally relates to vehicle roofs and, more specifically, to roof ditch channels that include mounting brackets.

BACKGROUND

Many vehicles include vehicle roofs that are welded to side panels of the vehicles. In order to facilitate welding, the vehicle roofs may be provided with a roof ditch that runs lengthwise along the vehicle roofs, between the vehicle roofs and the side panels of the vehicles. After welding the roofs to the side panels, the roof ditches may be filled with a sealer and/or preformed molding. The sealer may be in a liquid form and may tend to run lengthwise along the roof ditches. The liquid sealer may be applied using a nozzle that moves along the roof ditch. Objects in the roof ditches may interfere with application of the sealer.

What is needed are mounting brackets that can be mounted in roof ditches that reduce interference with nozzles that are applying sealer into the roof ditches.

SUMMARY

In accordance with one embodiment, a vehicle includes a roof assembly including a roof having an outer facing surface and a roof ditch that extends below the outer facing surface. The roof ditch extends in a vehicle longitudinal direction between a front windshield and a rear window. A roof ditch sealer is located at least partially within the roof ditch. A mounting bracket for mounting a vehicle accessory is located in the roof ditch. The mounting bracket may include sealer dam portions that extend downward at opposite sides of a mounting surface of the mounting bracket to provide end stops for the roof ditch sealer.

In accordance with another embodiment, a method of providing a mounting location in a roof ditch of a vehicle for mounting a vehicle accessory is provided. The method includes placing a mounting bracket in the roof ditch. The mounting bracket includes sealer dam portions that extend downward at opposite sides of a mounting surface of the mounting bracket. A roof ditch sealer is applied in the roof ditch. The sealer dam portions provide end stops for the roof ditch sealer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

FIG. 5 schematically depicts the mounting bracket along line 5-5 of FIG. 2 in operation, according to one or more embodiments shown and described herein.

DETAILED DESCRIPTION

Pickup trucks according to the present specification include a passenger cabin and a truck bed located rearward of the passenger cabin. The cabins are formed by side panels and a roof assembly that is connected to the side panels at opposite sides of the roof assembly. The roof assembly includes a vehicle roof that is connected to one side panel along a roof ditch that extends lengthwise from a front of the vehicle roof to a rear to the vehicle roof. The vehicle roof is also connected to another side panel along another roof ditch that extends lengthwise from the front of the vehicle roof to the rear of the vehicle roof.

A rear roof ditch sealer is located at least partially within the roof ditch. A mounting bracket is located in the roof ditch. The mounting bracket may be used for mounting a roof rack assembly, for example. The mounting bracket may include angled sealer dam portions that extend downward from a mounting surface of the mounting bracket at an angle to inhibit the passage of sealer thereby.

Figure 1:
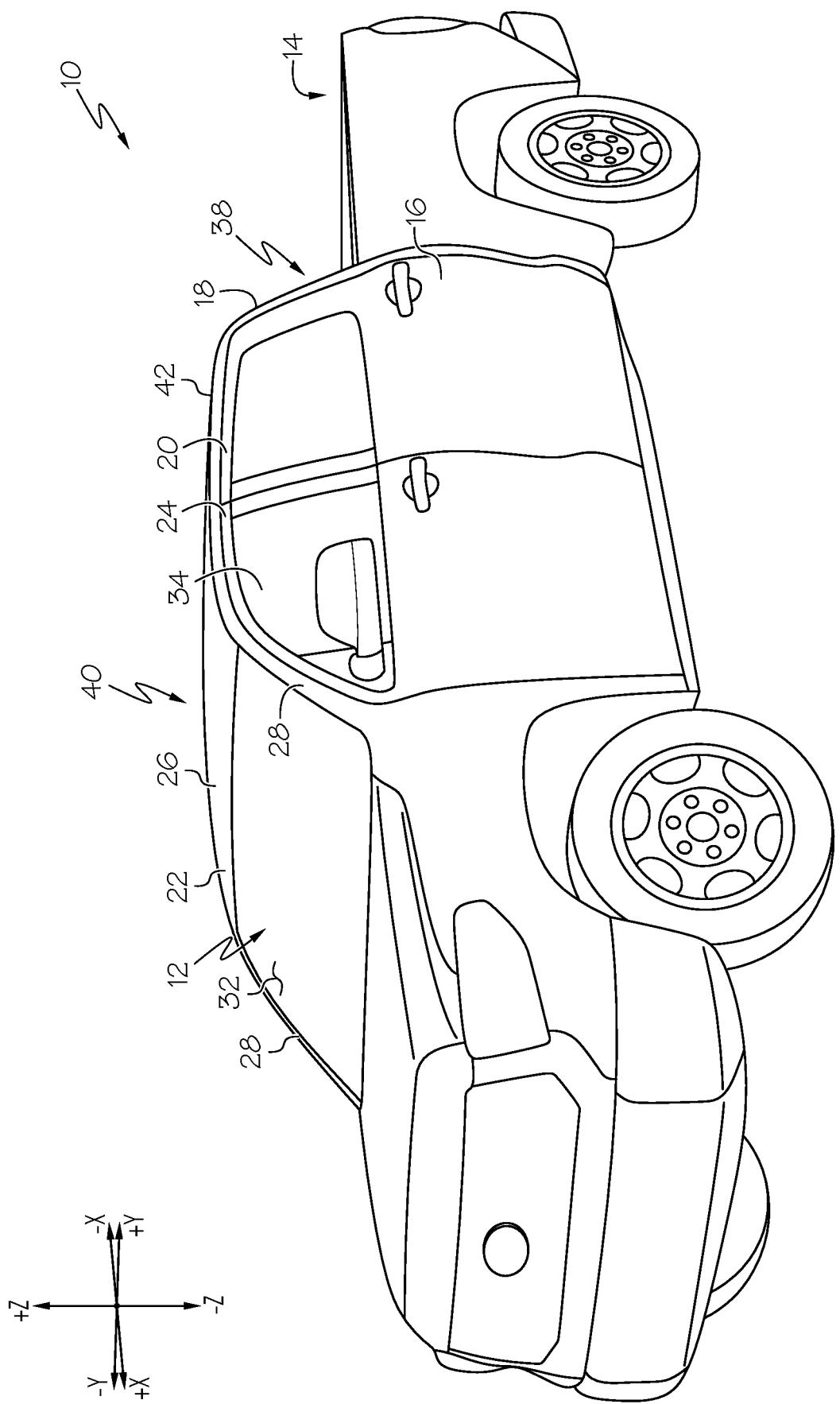
FIG. 1 depicts a front perspective view of a pickup truck, according to one or more embodiments shown and described herein.

As used herein, the term "vehicle longitudinal direction" refers to the forward-rearward direction of the pickup truck (i.e., in the +/− vehicle Y direction depicted in FIG. 1). The term "vehicle lateral direction" refers to the cross-pickup truck direction (i.e., in the +/− vehicle X direction depicted in FIG. 1), and is transverse to the vehicle longitudinal direction. The term "vehicle vertical direction" refers to the upward-downward direction of the pickup truck (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

Referring to FIG. 1, a pickup truck is generally illustrated at 10. The pickup truck 10 includes a passenger cabin 12 and a truck bed 14. The pickup truck 10 includes a vehicle body including a body framework 18 that includes a pair of side panels 20 and 22 with side roof rail structures 24 and 26 and front pillars 28. The front pillars 28 are connected to the side roof rail structures 24 and 26 and extend downwardly therefrom in the vehicle vertical direction. The front pillars 28 are located toward a forward end of the vehicle 10, generally between a front windshield 32 and front side windows 34.

The vehicle 10 includes a vehicle roof assembly 40 including a vehicle roof 42 that extends in the vehicle lateral direction between the side roof rail structures 24 and 26 and in the vehicle longitudinal direction between the front windshield 32 and a rear window 38. While only an outer vehicle panel is illustrated, the vehicle roof 42 may be formed of multiple panels, such as an inner vehicle panel that is connected to the outer vehicle panel. Further, the vehicle roof assembly 40 may include a headliner that can form an interior panel of the vehicle roof assembly 40 that can be viewed from within the cabin 12 of the vehicle 10. The headliner can also cover at least portions of the remaining vehicle roof assembly 40 from view from within the cabin 12.

Figure 2:
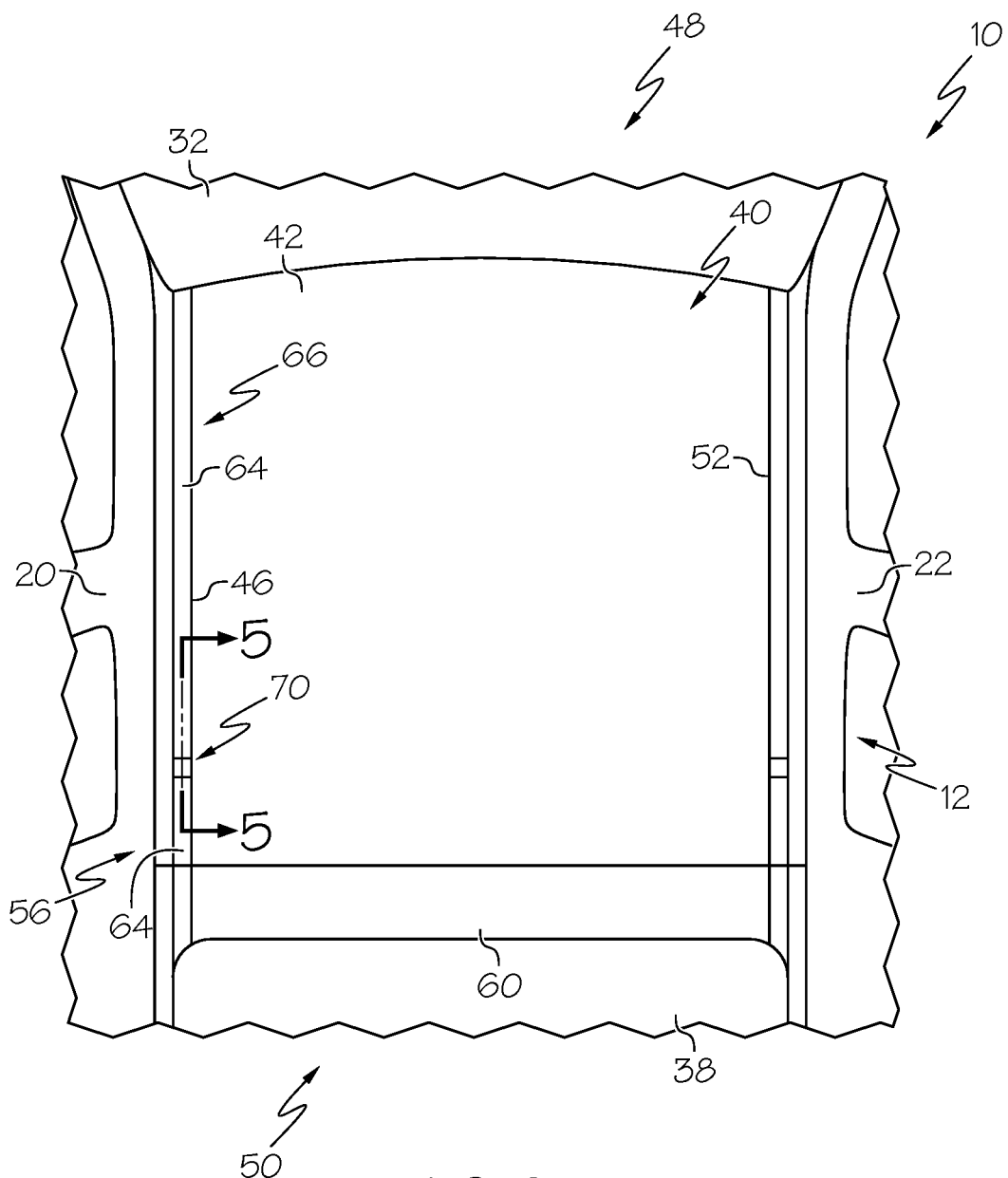
FIG. 2 schematically depicts a top of the pickup truck of FIG. 1 illustrating a roof assembly with mounting bracket, according to one or more embodiments shown and described herein.

Referring to FIG. 2, a diagrammatic top view of the pickup truck 10 is illustrated including the side panels 20 and 22 and the vehicle roof assembly 40. The vehicle roof assembly 40 includes the vehicle roof 42 that is connected to one side panel 20 along a roof ditch 46 that extends lengthwise between the front windshield 32 of the vehicle roof 42 and the rear window 38 of the vehicle roof 42. The vehicle roof 42 is also connected to another side panel 22 along another roof ditch 52 that extends lengthwise from the front 48 of the vehicle roof 42 to the rear 50 of the vehicle roof 42.

A cured roof ditch sealer 64 extends along a front portion 66 and rear portion 56 of the roof ditch 46. The cured roof ditch sealer 64 may be, for example, a PVC based body sealer with select additives for UV/Mold protection. A mounting bracket 70 is located at least between the front and rear portions 66 and 56. As will be described in greater detail below, the mounting bracket 70 includes sealer dam portions that inhibit passage of sealer 64 thereby and provide a stop surface against which the roof ditch sealer 64 can abut to reduce any gap formation between the mounting bracket 70 and the roof ditch sealer 64 in a reliable fashion.

Figure 3:
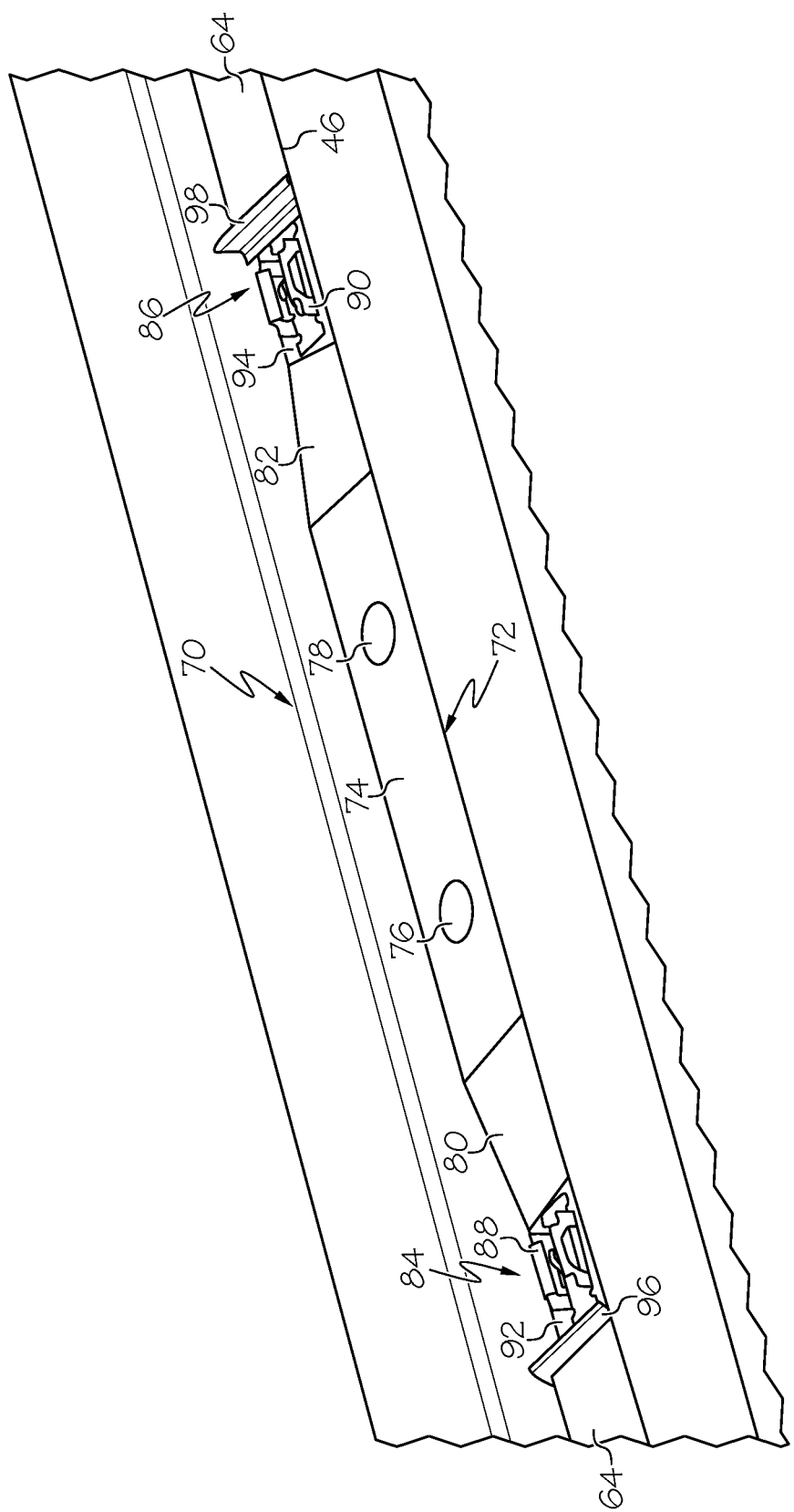
FIG. 3 schematically depicts a detail view of the mounting bracket of FIG. 2, according to one or more embodiments shown and described herein.

Referring to FIG. 3, a more detailed view of the mounting bracket 70 is illustrated. The mounting bracket 70 includes a central body 72 that provides an elevated mounting surface 74 with mounting openings 76 and 78 for mounting an accessory, such as a roof rack. In the illustrated example, the mounting surface 74 is a flat, planar surface, but the mounting surface 74 can have any suitable contour. The central body 72 is generally rectangular in shape and includes angled run-off portions 80 and 82 that extend downward toward a floor of the roof ditch 46 and outward in the vehicle longitudinal direction. Located at ends of the run-off portions 80 and 82 are dam clips 84 and 86. The dam clips 84 and 86 each have clips 88 and 90 that clip onto ends 92 and 94 of the run-off portions 80 and 82. The dam clips 84 and 86 include angled sealer dam portions 96 and 98 that extend downward at an angle to inhibit the passage of sealer thereby.

Figure 4:
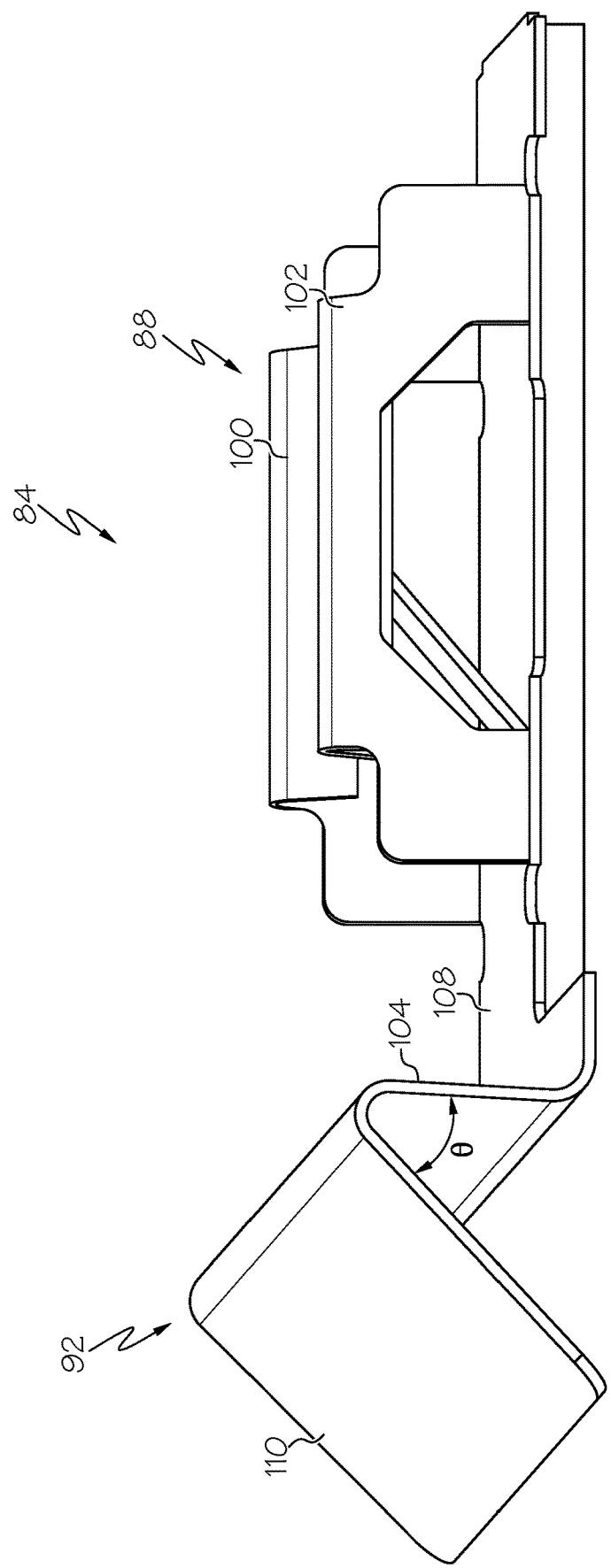
FIG. 4 schematically depicts a dam clip for the mounting bracket of FIG. 3, according to one or more embodiments shown and described herein.

FIG. 4 illustrates the dam clip 84 in isolation. The dam clip 86 may have the same or similar features. The dam clip 84 includes the clip 88 and the sealer dam portion 96. The clip 88 includes side clipping structures 100 and 102 that extend alongside the end 92 of the run-off portion 80 and over a top of the end 92 thereby holding the clip 88 in place against the central body 72. The sealer dam portion 96 includes a vertical wall 104 that extends upward from a base 108 of the clip 88 and an angled dam wall 110 that extends downward from the vertical wall 104 and outward in the vehicle longitudinal direction. An angle θ of the dam wall 110 to vertical may be less than an angle of the run-off portion 80 to provide a steeper dam surface 112 to face the sealer material.

Referring now to FIG. 5, a diagrammatic view of the mounting bracket 70 is illustrated and includes the central body 72, with mounting surface 74, angled run-off portions 80 and 82 and dam clips 84 and 86 with dam wall 110. The sealer 64 is located at both sides of the mounting bracket 70 and abuts the dam surface 112. As can be appreciated, the dam surfaces 110 inhibit passage of the sealer and minimize or even eliminate gaps. The run-off portions 80 and 82 can facilitate water running off the mounting surface 74 and reduce pooling of water.

In operation, the mounting bracket 70 is located within the roof ditch 46 and may be mounted therein to the vehicle roof 42 using, for example, fasteners. The roof ditch sealer 64 may be applied in paste form to the roof ditch 46. The roof ditch sealer may be self-leveling and flow within the roof ditch 46. The flow of the roof ditch sealer 64 may be dependent, at least in part, on the curvature of the vehicle roof 42 to which it is applied. The dam clips 84 and 86 provide a barrier between the the mounting surface 74 and the roof ditch sealer 64. The roof ditch sealer 64 may then be cured to form the cured roof ditch sealer 64. The cured roof ditch sealer 64 may then be painted along with the rest of the vehicle roof assembly 40 and then baked. A roof rack or other accessory can then be mounted to the mounting bracket 70.

The above-described mounting brackets include dam clips that provides front and rear barriers between mounting surfaces and roof ditch sealer. The dam clips provide the barriers which can provide a stop surface against which the roof ditch sealer can flow and be cured. The mounting brackets can provide a reliable end stop for the cured roof ditch sealer and inhibit overlap between the roof ditch sealer and the mounting surfaces to facilitate the mounting of an accessory.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a roof assembly comprising a roof having an outer facing surface and a roof ditch that extends below the outer facing surface, the roof ditch extends in a vehicle longitudinal direction between a front windshield and a rear window;
    a roof ditch sealer is located at least partially within the roof ditch; and
    a mounting bracket for mounting a vehicle accessory is located in the roof ditch, the mounting bracket includes dam clips connected to a bracket body of the mounting bracket that comprise sealer dam portions that extend downward at opposite sides of a mounting surface of the mounting bracket to provide end stops for the roof ditch sealer.

2. The vehicle of claim 1, wherein the mounting bracket comprises a run-off portions that extend outwardly at opposite sides of the mounting surface at an angle to horizontal.

3. The vehicle of claim 1, wherein the sealer dam portions are attached to a bracket body that provides the mounting surface.

4. The vehicle of claim 3, wherein the dam clips comprise clips that clip onto the bracket body.

5. The vehicle of claim 4, wherein the sealer dam portions each comprise an angled dam wall that extends downward from a vertical wall at an angle to vertical.

6. A method of providing a mounting location in a roof ditch of a vehicle for mounting a vehicle accessory, the method comprising:
   placing a mounting bracket in the roof ditch, the mounting bracket comprising dam clips connected to a bracket body of the mounting bracket that comprise sealer dam portions that extend downward at opposite sides of a mounting surface of the mounting bracket; and
   applying a roof ditch sealer in the roof ditch, the sealer dam portions providing end stops for the roof ditch sealer.

7. The method of claim 6, wherein the mounting bracket comprises a run-off portions that extend outwardly at opposite sides of the mounting surface at an angle to horizontal.

8. The method of claim 6, wherein the sealer dam portions are attached to a bracket body that provides the mounting surface.

9. The method of claim 8, wherein the dam clips comprise clips that clip onto the bracket body.

10. The method of claim 9, wherein the sealer dam portions comprise an angled dam wall that extends downward from a vertical wall at an angle to vertical.

\* \* \* \* \*